US009008807B2

(12) United States Patent
Shapiro et al.

(10) Patent No.: US 9,008,807 B2
(45) Date of Patent: Apr. 14, 2015

(54) METHOD OF LARGE SCALE PROCESS OPTIMIZATION AND OPTIMAL PLANNING BASED ON REAL TIME DYNAMIC SIMULATION

(75) Inventors: Vadim Shapiro, Clive, IA (US); Ilya Markevich, West Des Moines, IA (US); Dmitriy Khots, Omaha, NE (US)

(73) Assignee: Statistics & Control, Inc., West des Moines, IA (US)

( * ) Notice: Subject to any disclaimer, the term of this patent is extended or adjusted under 35 U.S.C. 154(b) by 298 days.

(21) Appl. No.: 13/481,206

(22) Filed: May 25, 2012

(65) Prior Publication Data
US 2013/0317629 A1    Nov. 28, 2013

(51) Int. Cl.
| | |
|---|---|
| *G05B 11/01* | (2006.01) |
| *G05B 13/02* | (2006.01) |
| *G06F 19/00* | (2011.01) |
| *G06G 7/10* | (2006.01) |
| *G05B 13/04* | (2006.01) |

(52) U.S. Cl.
CPC ...................................... *G05B 13/04* (2013.01)

(58) Field of Classification Search
CPC ........... B64G 3/00; G06F 19/12; G06F 19/18; G06F 19/24; G06F 19/3418; G06F 19/345; G06F 19/3462; G06F 19/3487; G06F 17/10; G06F 17/50; G06F 19/16; G06F 19/70; G06F 19/701; G06F 1/3206; G06F 3/044; G01N 23/00; G05B 13/04; G05B 13/02
USPC ........... 700/28–32, 40, 50, 51, 109, 130, 159, 700/174; 703/12
See application file for complete search history.

(56) References Cited

U.S. PATENT DOCUMENTS

| | | | | |
|---|---|---|---|---|
| 4,711,753 | A | * | 12/1987 | Miller et al. ................... 376/216 |
| 4,928,484 | A | * | 5/1990 | Peczkowski ..................... 60/240 |
| 5,024,801 | A | * | 6/1991 | Impink et al. .................. 376/217 |
| 5,075,881 | A | * | 12/1991 | Blomberg et al. ................. 703/2 |
| 5,245,528 | A | * | 9/1993 | Saito et al. ....................... 700/41 |
| 5,446,648 | A | * | 8/1995 | Abramovitch et al. .......... 700/53 |
| 5,519,605 | A | | 5/1996 | Cawlfield |
| 5,740,033 | A | | 4/1998 | Wassick et al. |
| 5,933,345 | A | * | 8/1999 | Martin et al. .................... 700/44 |
| 6,038,540 | A | * | 3/2000 | Krist et al. .................... 705/7.33 |
| 6,056,781 | A | * | 5/2000 | Wassick et al. ................. 703/12 |
| 6,347,254 | B1 | * | 2/2002 | Lu ................................... 700/29 |

(Continued)

OTHER PUBLICATIONS

Antoine, Marc et al., "Lifecycle Optimization for Power Plants", ABB, 2004, pp. 1-15.

(Continued)

*Primary Examiner* — Robert Fennema
*Assistant Examiner* — Thomas Stevens
(74) *Attorney, Agent, or Firm* — McKee, Voorhees & Sease

(57) ABSTRACT

This invention provides a system and method of Advanced Process Control for optimal operation of multi-unit plants in large scale processing and power generation industries. The invention framework includes the following components: continuous real time dynamic process simulation, automatic coefficient adjustment of dynamic and static process models, automatic construction of transfer functions, determination of globally optimal operating point specific to current conditions, provision of additional optimal operating scenarios through a variety of unit combinations, and calculation of operational forecasts in accordance with planned production.

27 Claims, 7 Drawing Sheets

FIG. 5

(56) References Cited

U.S. PATENT DOCUMENTS

| | | | |
|---|---|---|---|
| 6,826,521 B1 | 11/2004 | Hess et al. | |
| 6,941,177 B2 * | 9/2005 | Jackson et al. | 700/33 |
| 7,096,123 B1 * | 8/2006 | McAdams et al. | 702/22 |
| 7,433,743 B2 * | 10/2008 | Pistikopoulos et al. | 700/52 |
| 7,949,624 B2 * | 5/2011 | Kelly et al. | 706/46 |
| 8,069,101 B1 * | 11/2011 | Von Groll et al. | 705/35 |
| 8,195,581 B2 * | 6/2012 | Backstrom et al. | 706/6 |
| 8,494,798 B2 * | 7/2013 | Kettaneh et al. | 702/83 |
| 2002/0123864 A1 * | 9/2002 | Eryurek et al. | 702/188 |
| 2003/0046130 A1 * | 3/2003 | Golightly et al. | 705/7 |
| 2003/0195665 A1 * | 10/2003 | Cutler | 700/266 |
| 2003/0220828 A1 * | 11/2003 | Hwang et al. | 705/8 |
| 2004/0117042 A1 * | 6/2004 | Jackson et al. | 700/51 |
| 2005/0154477 A1 * | 7/2005 | Martin et al. | 700/37 |
| 2007/0050053 A1 * | 3/2007 | Cutler | 700/34 |
| 2007/0168057 A1 | 7/2007 | Blevins et al. | |
| 2007/0299619 A1 * | 12/2007 | Marik et al. | 702/30 |
| 2008/0082195 A1 * | 4/2008 | Samardzija | 700/109 |
| 2008/0109100 A1 * | 5/2008 | Macharia et al. | 700/110 |
| 2009/0143871 A1 * | 6/2009 | Gao et al. | 700/29 |
| 2009/0157590 A1 | 6/2009 | Mijares et al. | |
| 2009/0198350 A1 * | 8/2009 | Thiele | 700/30 |
| 2009/0287320 A1 * | 11/2009 | MacGregor et al. | 700/29 |
| 2010/0191361 A1 * | 7/2010 | McCready et al. | 700/104 |

OTHER PUBLICATIONS

ABB, "Life cycle management and service", http://www.abb.com/cawp/seitp202/4147d1a7902da406c125798700342fa4.aspx [relieved from the Internet on Jul. 10, 2012], 3 pages.

Honeywell "Optimization solution White Paper: An Overview of Honeywell's Layered Optimization Solution", 2009, pp. 1-16.

IBM, "The State of Smarter Energy Utilities: Smarter Industries Symposium, Barcelona, Nov. 2010", 7 pages.

Qin, S. Joe et al., "An Overview of Industrial Model Predictive Control Technology", AIChE Conference, 1996, pp. 1-31.

\* cited by examiner

METHOD OF LARGE SCALE PROCESS OPTIMIZATION AND OPTIMAL PLANNING BASED ON REAL TIME DYNAMIC SIMULATION

BACKGROUND OF THE INVENTION

Advanced Process Control (APC) and Multivariable Predictive Control (MVPC) are considered established technologies in the large scale processing and power industries with a plethora of published material, e.g. Qin S. Joe and Thomas A. Badgwell, "An Overview of Industrial Model Predictive Control," AIChE Conference, 1996, J. A. Rossiter, "Model-Based Predictive Control: A Practical Approach," 2003 and Eduardo F. Camacho and Carlos Bordons, "Model Predictive Control," 2007.

Recently a lot of attention was paid to optimal operation of multi-unit plants, e.g. a white paper by Honeywell, "Optimization Solution White Paper: an Overview of Honeywell's Layered Optimization Solution", 2009, and another white paper by ABB, "Lifecycle Optimization for Power Plants," 2004, followed by ABB's news release in 2012 titled "Life cycle management and service". Additionally, IBM has been promoting its Smarter Planet for energy and utilities, see, for example, white paper, "The State of Smarter Energy and Utilities," 2010.

As equipment performance, production demands, and process and ambient conditions all fluctuating, determine the optimal operating mode across multi-unit plants are complicated. Control and data acquisition systems provide an extensive quantity of process data. However, the multidimensional analysis required to achieve optimal operation are often beyond human ability.

Some of the challenges addressed in these publications are the inefficiencies existing in current large scale processing and power generation providers and the need for holistic control, not just geared towards specific units, but for the entire plant operation or even a plant network, involving multi-unit designs, which ultimately provides optimal process operation.

Examples of multi-unit plants in large scale processing and power industries include:
 Oil field operations with a large number of surface pumping units, oil pipe line networks, well test gathering stations, and storages.
 Gas and oil pipeline networks, equipped with a large number of pumping stations and pumping units.
 Steam flood operations with a large number of steam generating stations and steam generators.
 Hydrocarbon processing plants.
 Power Generation plants equipped with gas/steam turbine driven generators, heat recovery steam generators, and boilers.
 Power distribution network with a large amount of electrical producers and consumers.
 Water treatment plants and water distribution network.

The benefits of APC/MVPC (with basic foundations described well in U.S. Pat. No. 5,740,033 issued on April 1998 to Wassick et al. as well as U.S. Pat. No. 5,519,605 issued on May 1996 to Cawlfield) systems implementation into multi-unit plants include the following:
 Assistance in achieving optimal operation by accurately responding to real time demands and limitations.
 Process optimization to reduce energy consumption in meeting delivery commitments.
 Enhancing companies' ability to manage data and make better operating and prospecting decisions.
 Improving process stability, allowing operation closer to target, constraint and optimum values.
 Forecasting, process simulation, determining the ability to meet obligations.

The large scale processing and power industries exhibit high demand for a decision support system that encompasses all of the above automation functions for plant networks, that is loaded with the state-of-the-art algorithms and models, and that is ultimately able to effectively communicate its performance and recommendations to decision makers throughout the organization. The current invention is the cost effective solution to this demand.

SUMMARY OF THE INVENTION

A system and method of Advanced Process Control for optimal operation of multi-unit plants in large scale processing and power generation industries is provided. The disclosed invention consists of continuous real time dynamic process simulation running in parallel to real process, automatic coefficient adjustment of dynamic and static process models, automatic construction of transfer functions, determination of globally optimal operating point specific to current conditions, provision of additional optimal operating scenarios through a variety of unit combinations, and calculation of operational forecasts in accordance with planned production.

All components of the invention, including forecasting, simulation, control, and optimization, rely heavily on process model accuracy. The disclosed process model is a set of differential and algebraic equations, which describes and solves representations of a large scale technological process. In other words, the process model is a combination of material and energy balances, which are statements on conservation of mass and energy, respectively. These models represent functional dependencies between highly interconnected (both linearly and nonlinearly) multiple inputs, multiple outputs and multiple losses and are used by the optimization applications for finding, recommending, and deploying improvements of the process.

The first major component of the disclosed invention is the Continuous Real Time Dynamic Process Simulation. Its objective is to create a virtual process that can be investigated or manipulated. The benefits of having such simulation are described well in U.S. Publication No. 2007/0168057 A1 published in July 2007 by Blevins et al. The uniqueness of the proposed invention lies in the method and apparatus for accomplishing this for large scale multi-unit systems. Process simulation occurs concurrently with process operation and reflects process dynamics. First, it is used to compare simulated and measured variables in order to determine model accuracy and adjust model's coefficients. Second, it is a cost effective method of determining transfer functions, discussed below, that avoids costly step testing. Because of high degree of accuracy of process models, the dynamic simulation accurately represents the process and can include all the major control loops; thus, it becomes possible to verify behavior of various events at initial system design and to analyze occurring transient processes.

The second major component of the disclosed invention is the Automatic Coefficient Adjustment across all static and dynamic process models. The need to adjust model coefficients exists whenever process changes occur, driven either by ambient event occurrences, equipment failure or changes in operational demand. This is well described in U.S. Pat. No. 6,826,521 issued in November 2004 to Hess et al. What makes this invention unique is that model coefficients are adjusted in online mode, depending on severity of process changes. Static models are described by algebraic equations, which are second, or fourth order polynomials acquired through ordinary least squares or partial least squares methods. Dynamic models are described by differential equations. The polynomial and dynamic models coefficients are adjusted automatically using particle filters, also known as Sequential Monte Carlo (SMC) methods, which are model estimation techniques based on simulation. The criteria for models coefficient adjustment is based on the comparison of the current measured process variables values with its simulated value.

The third major component of the disclosed invention is the Automatic Transfer Function Generation. A transfer function is a relationship between input and output signals within a system. The proposed optimization module empirically generates input/output transfer functions using data obtained from the simulated open-loop steps performed on the current model structure. For control purposes, transfer functions are described by first order plus time delay form, described in detail below. The proposed invention accommodates for various structural forms of transfer functions including parallel, in series, and combination input/output designs. In particular, transfer functions are automatically generated when system input is an ambient process disturbance.

The fourth major component of the disclosed invention is the Operating Mode Optimization. The optimization system uses automatically generated transfer functions to find the optimal mode based on the given optimization criteria. Standard optimization techniques, such as branch and bound, are used to find the global optimum. For differentiable process models, the partial derivatives are computed in domain and the objective function values are recorded. At the plant level, the optimization problem is solved either by unit shut down/start up or unit load sharing. The criteria for optimal load sharing is based on the comparison of the current objective function value with its value computed using the static model after the planned change in loads. Further reference to benefits of optimizing operational processes is well laid out in U.S. Publication No. 2009/0157590 A1 published in June 2009 by Mijares et al. What makes this invention unique is that the optimization system uses automatically generated transfer functions to find the optimal mode.

Finally, the fifth major component of the disclosed invention is Optimal Planning and Scheduling. This capability allows to solve major business problems including sequencing, scheduling of equipment operation, and load distribution over a planned period. The algorithm consists of two steps: finding optimal operating scenario (as a combination of unit start-ups/shut-downs, for example) based on predicted future conditions over an operator defined time horizon and creating an optimal forecast using time series and regression techniques for the same time frame. Ultimately, the best operating mode is suggested given current and future conditions, and is continuously updated based on process changes.

DETAILED DESCRIPTION OF THE PREFERRED EMBODIMENTS

Figure 1:
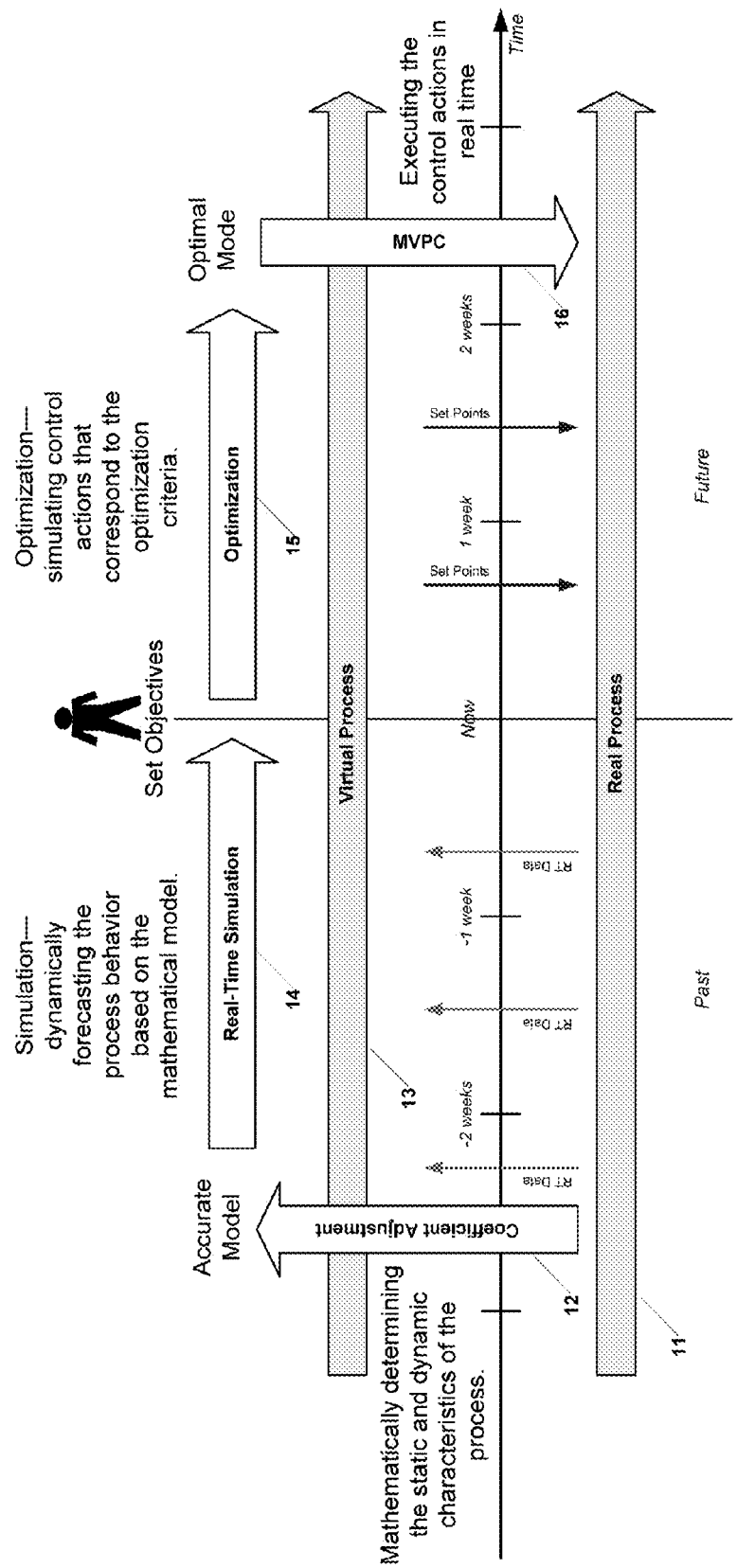
FIG. 1 shows Large Scale Process Optimization and Optimal Planning Based on Dynamic Simulation Conceptual design.

The invention's conceptual design is shown and described in FIG. 1. The proposed system mathematically determines static and dynamic characteristics of the real process 11 by creating a concurrent virtual process 13. This is achieved by building accurate process models via automated coefficient adjustment 12. At any given point of time, historical information is used for real time simulation 14 to dynamically forecast the process behavior based on the mathematical models. Then, optimization 15 is used to simulate control actions that correspond to optimization criteria. Optimization criteria can be one or a combination of goals, such as least cost, minimum emission, maximum production, or the like. The Optimization and Scheduling Modules determine optimal set-points for all process components across multi-unit plants. Finally, optimal mode is found and either supplied to an operator for manual entry or control actions are executed in real time by the Multi Variable Process Control (MVPC) 16.

Figure 2:
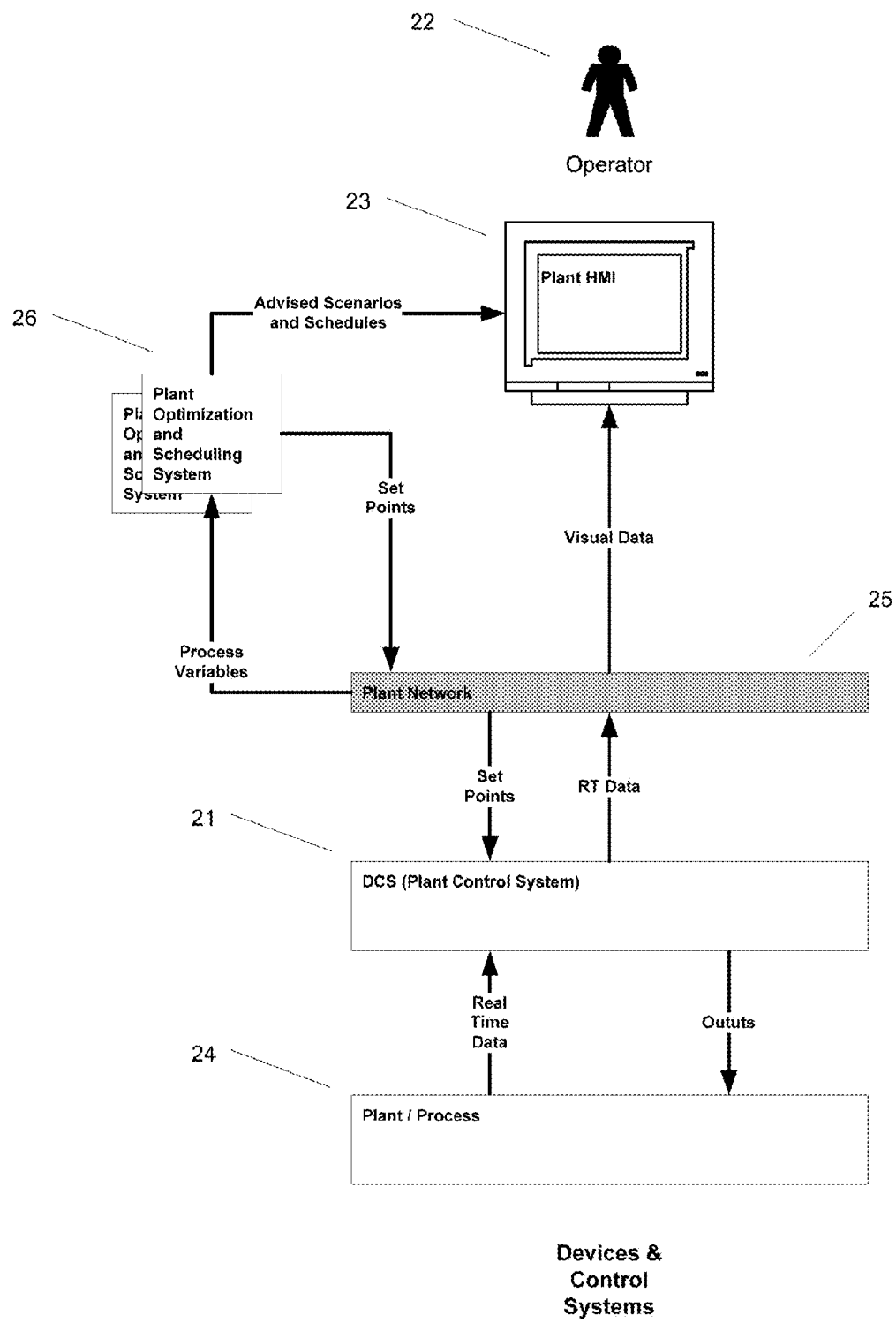
FIG. 2 shows Plant Optimization and Scheduling System architecture.

The overall system architecture is described in FIG. 2. The left hand side of FIG. 2 shows a typical Distributed Control System (DCS) 21, which comprises an I/O module, logic controllers, and operator stations. An operator 22 uses the graphic workstation (Human/Machine Interface, HMI) 23, to monitor and control the process 24. The logic controllers provide the interface with process I/O and execute sequential and regulatory control functions. The data management and gateway functions are distributed on a plant control network 25 to ensure system integrity and timely data transmission. Plant control network 25 connects the Operating and Control levels of the system allowing uninterrupted access to real-time process information, alarms, and events.

Plant Optimization and Scheduling System 26 is installed on separate servers, which are also connected to the plant control network 25 in order to have full access to real time and historical operation data for all production units. Data needed for optimal operation of the Plant Optimization and Scheduling System 26 includes process data, plant-wide equipment conditions, critical operating parameters, and performance conditions. The system utilizes modeled information (described in detail below), real time and historical data to perform optimization and planning functions, and sends set point information to logic controllers. The Plant Optimization and Scheduling System 26 also provides presentation of plant-wide simulation, optimal scenarios, and optimal schedules on operator workstations 23.

Figure 3:
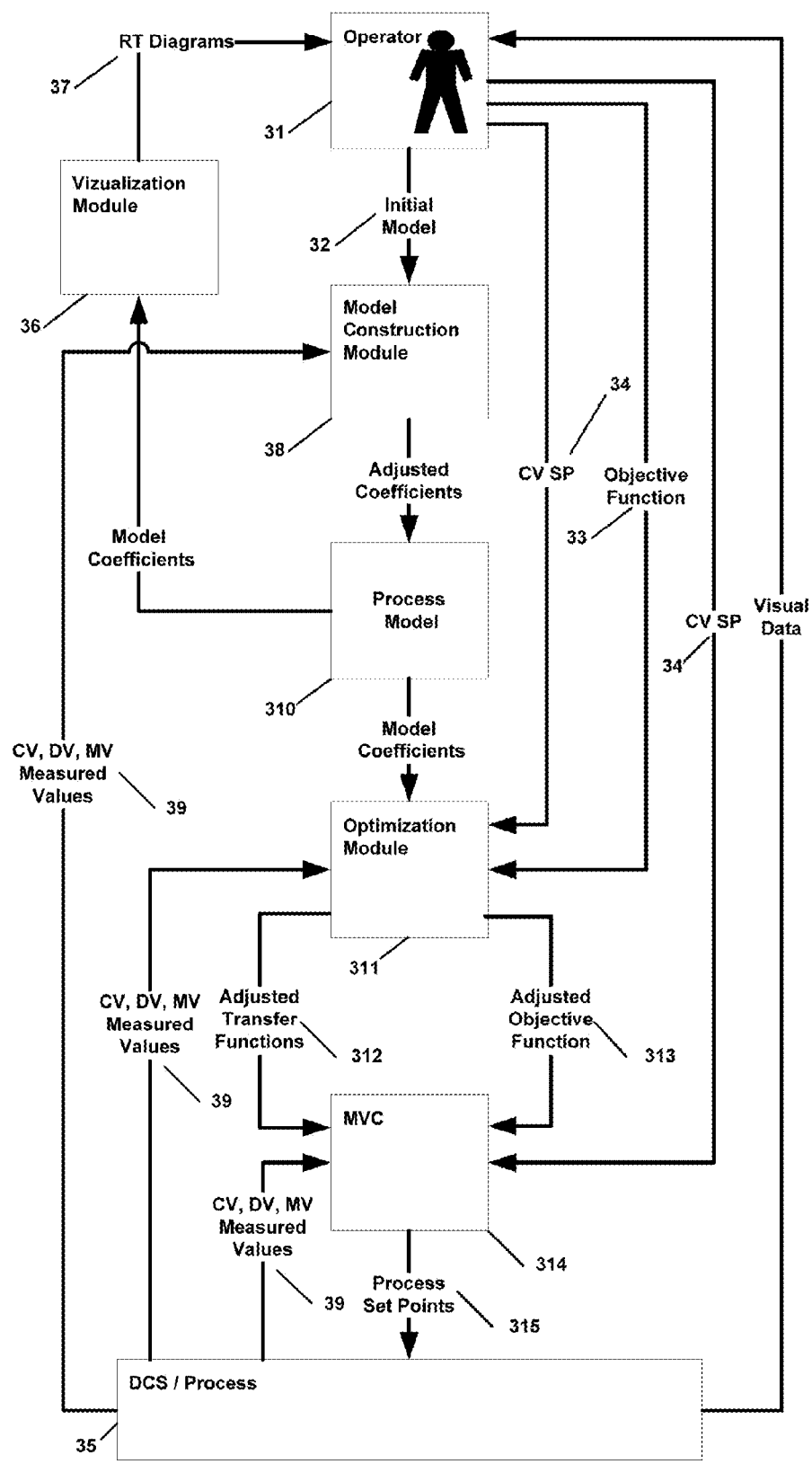
FIG. 3 shows the algorithm of the Multi Variable Predictive Controller (MVPC).

FIG. 3 shows the algorithm of the Multi Variable Predictive Controller (MVPC), which is a simulation-based predictive and optimizing control module capable of handling control problems with multiple independent inputs and with multiple outputs that have significant interactions. The key to successful operation of the MVPC is an accurate process model, which in this case is built as the mass and energy balancing model.

Referring to FIG. 3, the algorithm starts with the Operator 31 configuring the initial model coefficients 32, which can be estimated from equipment manufacturer specifications. The Operator 31 also specifies optimization criteria (e.g. maximize revenue or minimize cost), which is provided to the system in terms of an Objective Function 33 and sets the Controlled Variables Set Points (CV SP) 34. To help the Operator make necessary decisions, the system is equipped with two visual interfaces. One is supplied by the DCS 35 and one is supplied by the MVPC via a built-in Visualization Module 36. The integrated Visualization Module 36 provides real time content 37 to the Operator 31 and allows the Operator 31 to manage MVPC control actions via a PC-based graphical user interface. More specifically, the Visualization Module 36 diagram displays an operating envelope, showing the location of process operating points in relation to the constraints. The station Visualization Module provides calculations, lookup tables, process real time (RT) capabilities diagrams 37, and performance testing information.

The MVPC algorithm then proceeds as follows. The Model Construction Module 38 receives real time values of Manipulated Variables (MV), Controlled Variables (CV) and Disturbance Variables (DV) 39 from the DCS 35. It uses predictive modeling and data mining techniques, such as ordinary least squares regression (OLS), partial least squares regression (PLS), decision trees (DT), and artificial neural networks (ANN) to simultaneously identify static and dynamic process characteristics. The resulting Process Model 310 is a collection of equations in steady-state working conditions that describe the interdependencies between units and process variables.

The static equations are given by standard multivariable formulas in the form $$y = f(x_1, \ldots, x_n)$$

where y is the dependent variable and $x_1, \ldots, x_n$ is a set of independent variables influencing y. In case of OLS, f is usually a polynomial of degree two or four. In case of PLS, f is also characterized by a polynomial, however, $x_1, \ldots, x_m$ are now projections of original independent variables (aka factors), with m<n. PLS is often used when highly correlated independent variables are detected. In case of DT, the equation is replaced by "if-then" binning rules of all predictor variables that maximize the explained variability of the target. In case of ANN, the activation functions are characterized by $$h_j = \tanh\left(b_j + \sum_i w_{ij} x_i\right)$$

where b and w are the estimates/weights and j is the number of hidden units in the network. The dynamic model is a collection of differential equations that describe the process transitional state.

Additionally, the MVPC algorithm also has a built-in process shift detection algorithm (utilizing time series and six sigma techniques) that allows it to identify the severity of process changes so that models can be re-calibrated (i.e. the model coefficients adjusted) either in offline or online modes using real-time and historical data.

The resulting process model is then fed into the Optimization Module 311 and the Visualization Module 36 for monitoring purposes. The Optimization Module 311 also receives real time data from the DCS 35 along with the operator chosen Objective Function 33 and CV SP 34. Optimization Module 311 uses both steady-state and dynamic modeled information to predict how the process will respond to changes in each of the independent variables. Ultimately, the Optimization Module 311 provides two types of output: adjusted transfer functions 312 (described in detail below), which are generated through online simulation testing of the dynamic model and adjusted objective function 313, which is the operator provided objective function with optimized coefficients.

The next step of the algorithm loads the Optimization Module 311 output directly into MVPC 314. In addition, the MVPC 314 receives real time data from the DCS 35 as well as operator provided CV SP 34. MVPC 314 uses the steady optimal values of Manipulated Variables (MV) as targets and calculates future moves that will maintain the operation at specified targets. The MVPC 314 predicts future changes in controlled variables (CV) and determines past changes in MV and disturbance variables (DV). Then MVPC 314 calculates new changes in MV in order to ensure that targets for CV (CV SP) are reached and account for Operator chosen optimization criteria.

Specifically, the objective function that serves as input to the MVPC algorithm can be described by the following formula:

$$U(MV_1, \ldots, MV_n, DV_1, \ldots, DV_m)$$

The Input/Output transfer functions are described by $$W(MV_1, \ldots, MV_n, DV_1, \ldots, DV_m)$$

Setting J to be the Time to Steady State, for each $j = 1, \ldots, J$ transfer functions can be defined by $$W_j(MV_1, \ldots, MV_n, DV_1, \ldots, DV_m)$$

Then the optimization problem can be stated as follows:

$$\left(SPCV - \sum_i W_j(MV_i DV_i)\right)^2 \to 0$$

and $$U(MV_1, \ldots, MV_n, DV_1, \ldots, DV_m) \to \min$$

Subject to constraints provided by the Operator 31, which are integrated into the objective function via multipliers. In case of differentiable objective functions (which is often the case with OLS output), the solution (set of optimal MVs) is found at the point where the partial derivatives of the objective function are zero. The algorithm continuously repeats to ensure accuracy of current process representation. Ultimately, the MVPC sends set points 315 to Distributed Control System process controllers 35.

As displayed in FIG. 3, one of the key system components is the Model Construction Module 38. The dynamic models generated by the module can be described by a collection of differential equations that characterize the transitional state of the process. Process simulation is analytically achieved using this set of differential equations. The ultimate goal of process simulation is to determine transfer functions that relate input disturbances to output changes over time. The Real-time Optimization Module (RTO, see FIG. 5 for details) empirically generates Input/Output transfer functions using data obtained from the simulated open-loop step performed on the current dynamic process model.

Specifically, RTO simulates a DV and MV step change test such as DVs and MVs are changed separately to observe the CV response. As most processes tend to be nonlinear, several open-loop step change tests are performed for each variable to obtain the most accurate transfer function. For each individual transfer function, RTO identifies the Time to Steady State, Time Delay, Process Gain, and Time Constant (discussed in detail below). Once the Input/Output transfer function is known, it is possible to predict the system's reaction after any disturbance and at any given time. Also, it is possible to compute the MV value so that the integrated (over time) deviation of CVs from the set point would be minimal.

Figure 4:
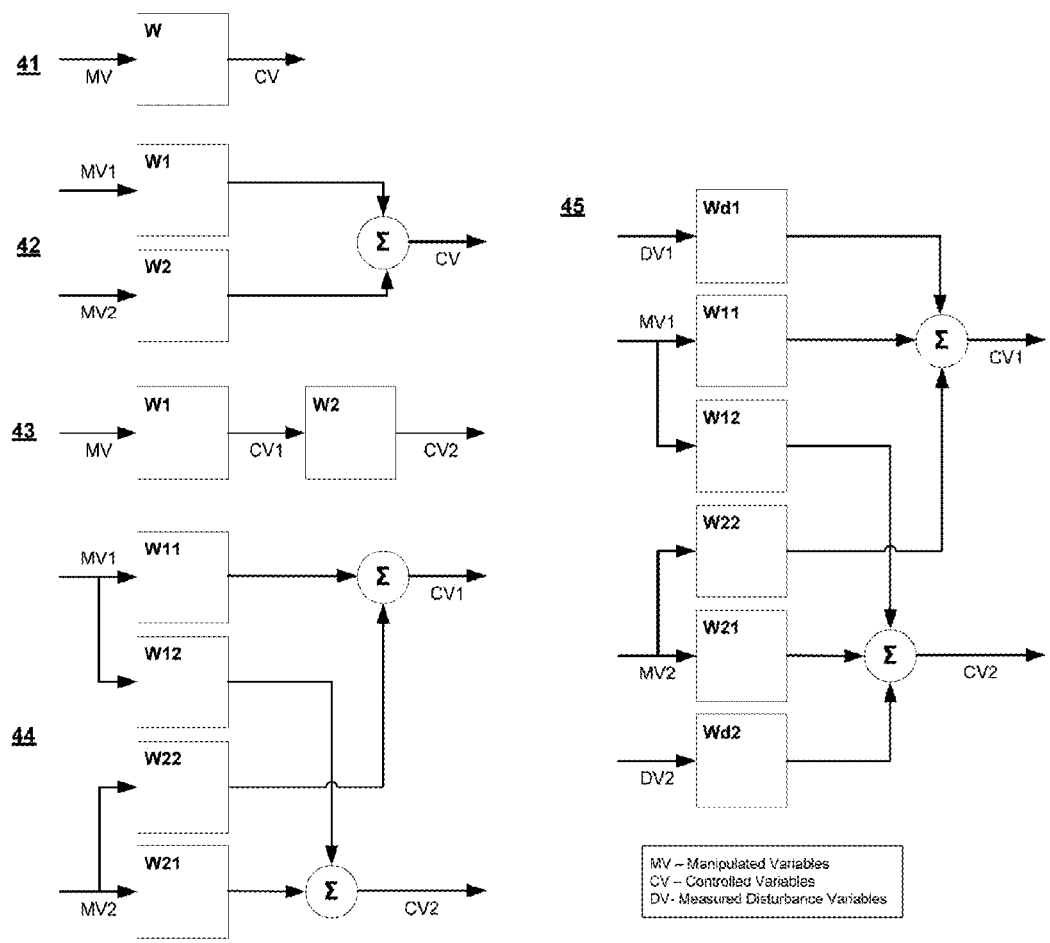
FIG. 4 shows supported structure of input/output transfer functions including parallel, in-series, combination, and ambient disturbance elements.

FIG. 4 shows a variety of transfer functions that can be generated by the RTO. For control purposes, transfer functions are described by first order plus time delay form 41:

$$W(s) = \frac{k_p e^{-sv}}{\tau_p s + 1}$$

where $k_p$ is the process gain, $t_p$ is the process time constant, and u is process time delay. The Input/Output transfer function may assume a number of structural forms. First form is Parallel 42.

$$CV = \sum_{i=1}^{z} W_i MV_i$$

Second form is in series 43

$$CV_2 = W_1 W_2 MV_1$$

For systems with more than one output, the Input/Output transfer function has the third combined form 44, where the outputs are related to the inputs as follows:

$$CV_1 = W_{11} MV_1 + W_{22} MV_2$$

$$CV_2 = W_{12} MV_1 + W_{21} MV_2$$

Processes are influenced by external disturbances, such as changes in ambient conditions, changes in the fuel quality, etc. To accommodate these effects, process disturbances are incorporated into the model with disturbance transfer functions of the fourth form 45:

$$CV_1 = W_{d1} DV_1 + W_{11} MV_1 + W_{22} MV_2$$

$$CV_2 = W_{d2} DV_2 + W_{12} MV_1 + W_{21} MV_2$$

Figure 5:
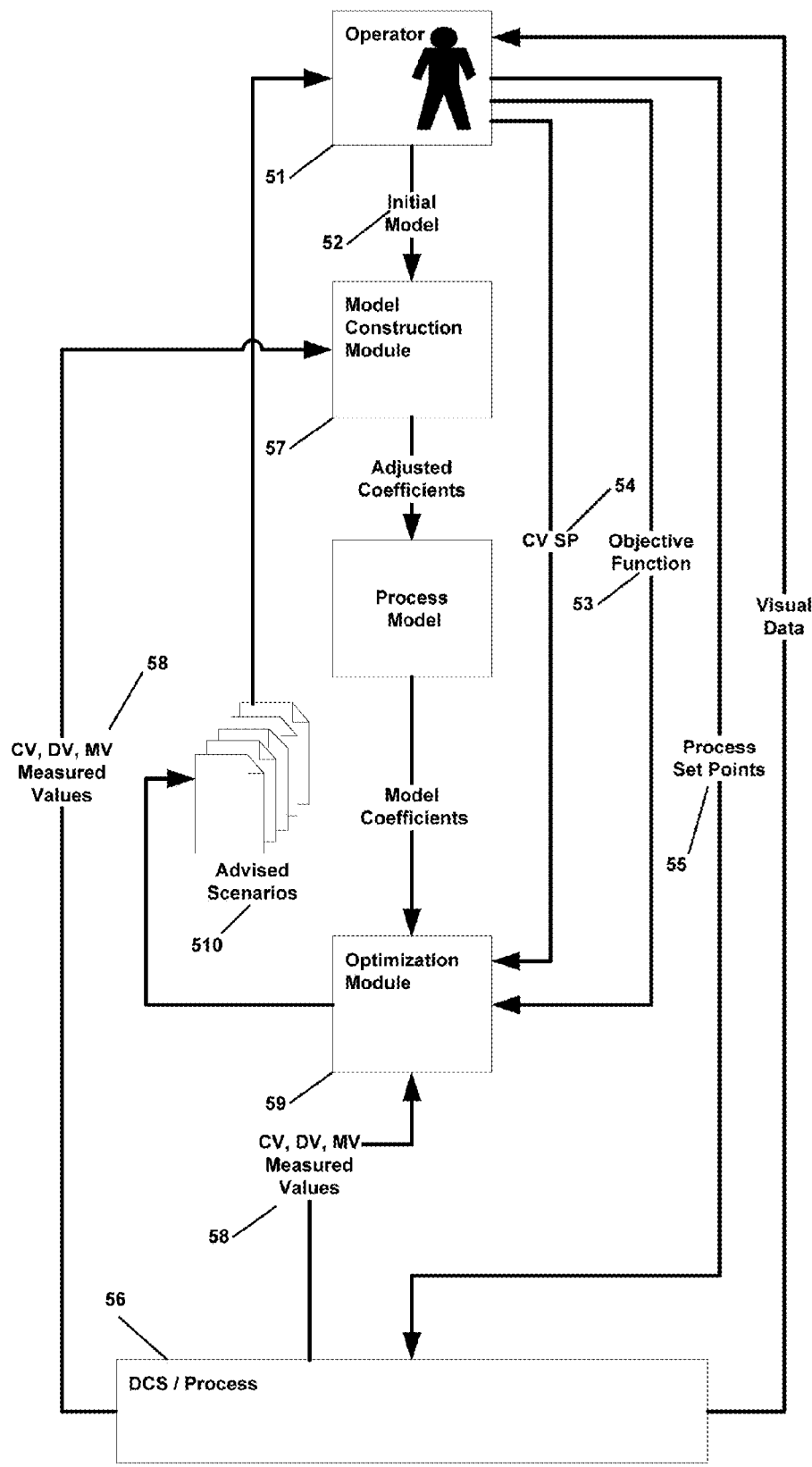
FIG. 5 shows the algorithm of the Real-Time Optimization Module (RTO).

Referring now to FIG. 5, the Real-Time Optimization Module (RTO) is implemented with the following algorithm. Similar to MVPC, the RTO algorithm starts with the Operator 51 configuring the initial model coefficients 52. This step can be accomplished as part of the MVPC set up as well. For a given optimization problem, the Operator 51 is also expected to set the Objective Function 53, the Controlled Variables Set Points (CV SP) 54 as well as the overall Process Set Points 55. The RTO module also utilizes the Visualization Module available in MVPC and receives visual feedback from the DCS 56.

The RTO algorithm proceeds similarly to the MVPC algorithm. The Model Construction Module 57 receives real time values of Manipulated Variables (MV), Controlled Variables (CV) and Disturbance Variables (DV) 58 from the DCS 56 and has the same modeling toolkit as the Model Construction Module in the MVPC algorithm.

Next, the Optimization Module 59 uses DCS supplied real time data 58 along with the operator chosen Objective and Constraint Functions 53, with coefficients provided by the Model Construction Module 57, and CV SP 54 to optimize the process. The RTO module uses a standard suite of optimization methods to globally optimize the objective function subject to the provided constraints. These methods include, but are not limited to, the following: integer programming, linear programming, mixed integer programming, mixed integer non-linear programming, quasi-Newton method, Nelder-Mead Simplex Method, and Lagrange multipliers (that transform the constrained optimization problem into an unconstrained problem).

Ultimately, RTO calculates the steady optimal values of manipulated variables (MV) and provides these values to the Operator 51 as Suggested Scenarios 510. These suggested Scenarios 510 may include a number of requests for unit shut-down/start-up as well as unit load sharing strategy. All available optimal scenarios (based on a range of expected future conditions) are relayed to the Operator 51 along with economic assessments that provide support for operating decisions.

Figure 6:
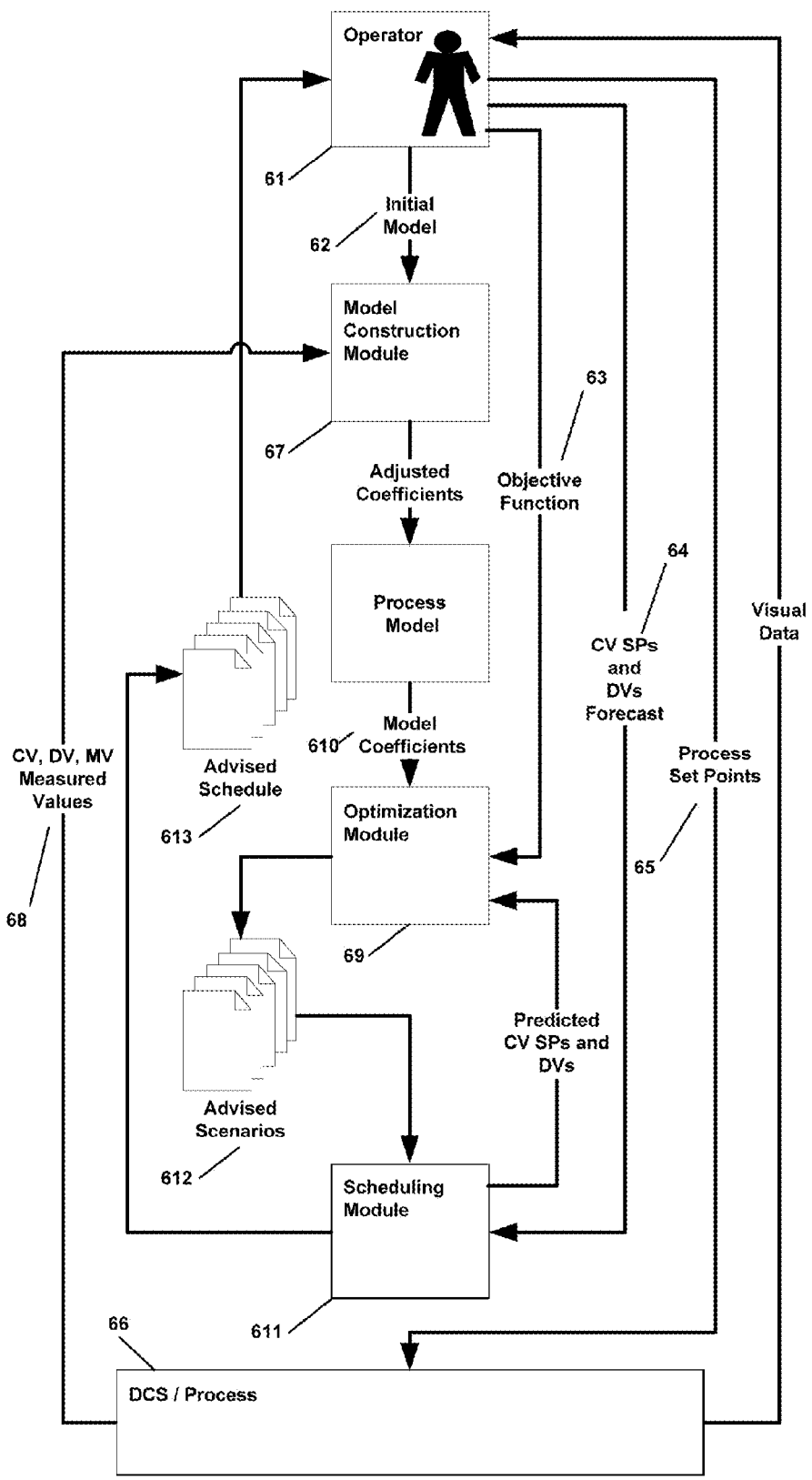
FIG. 6 shows the algorithm of the Scheduling Module.

FIG. 6 shows the algorithm of the Scheduling Module, which is the key component of the overall system. The Scheduling Module balances production with a range of constraints on daily, weekly, and monthly bases and builds process operating forecast in accordance with planned production and consumption. The Scheduling Module integrates with the other components of the system in a fashion similar to MVPC and RTO modules.

Referring now to FIG. 6, the first step requires the Operator 61 to provide information necessary for the schedule to be created. This information is the initial model coefficients 62, the function to be optimized along with its constraints 63, CV SP and DV forecast (demand, for example) 64, and the overall Process Set Points 65. To help assist in decision making, the Operator 61 also has access to the MVPC Visualization Module and the DCS Visualization Module 66.

During the second step, the Model Construction Module 67 receives real time values for all MVs, CVs and DVs 68 from the DCS 66 and builds models using the same modeling toolkit available in the MVPC and RTO modules.

For the third step, the Optimization Module 69 uses the operator chosen Objective and Constraint Functions 63 with coefficients 610 provided by the Model Construction Module 67 along with demand predicted by the Scheduling Module 611 to find optimal scenarios within an operator defined time period. As described above, for each defined time period, the RTO provides optimal MV values to the Operator as well as to the Scheduling Module 611 as a set of Suggested Scenarios 612, which include unit shut down and start-up requests as well as load sharing strategies.

During the fourth step, the Scheduling Module 611 employs genetic algorithms to find optimal solutions to efficient operating mode problems as well as forecast parameter search problems. The Scheduling Module 611 evaluates the fitness of each Suggested Scenario 612 according to following criteria:

objective function is satisfied while none of the constraints are violated;
number of requests for unit shut down/start-up is minimal and satisfies shut down/start-up limits;
controlled variables meet predicted demand; and
most profitable and optimal operation is ensured.

This algorithm repeats and updates itself until incremental improvements are no longer financially viable. Finally, the Scheduling Module 611 provides the optimal schedule and forecast 613 to the Operator 61.

Figure 7:
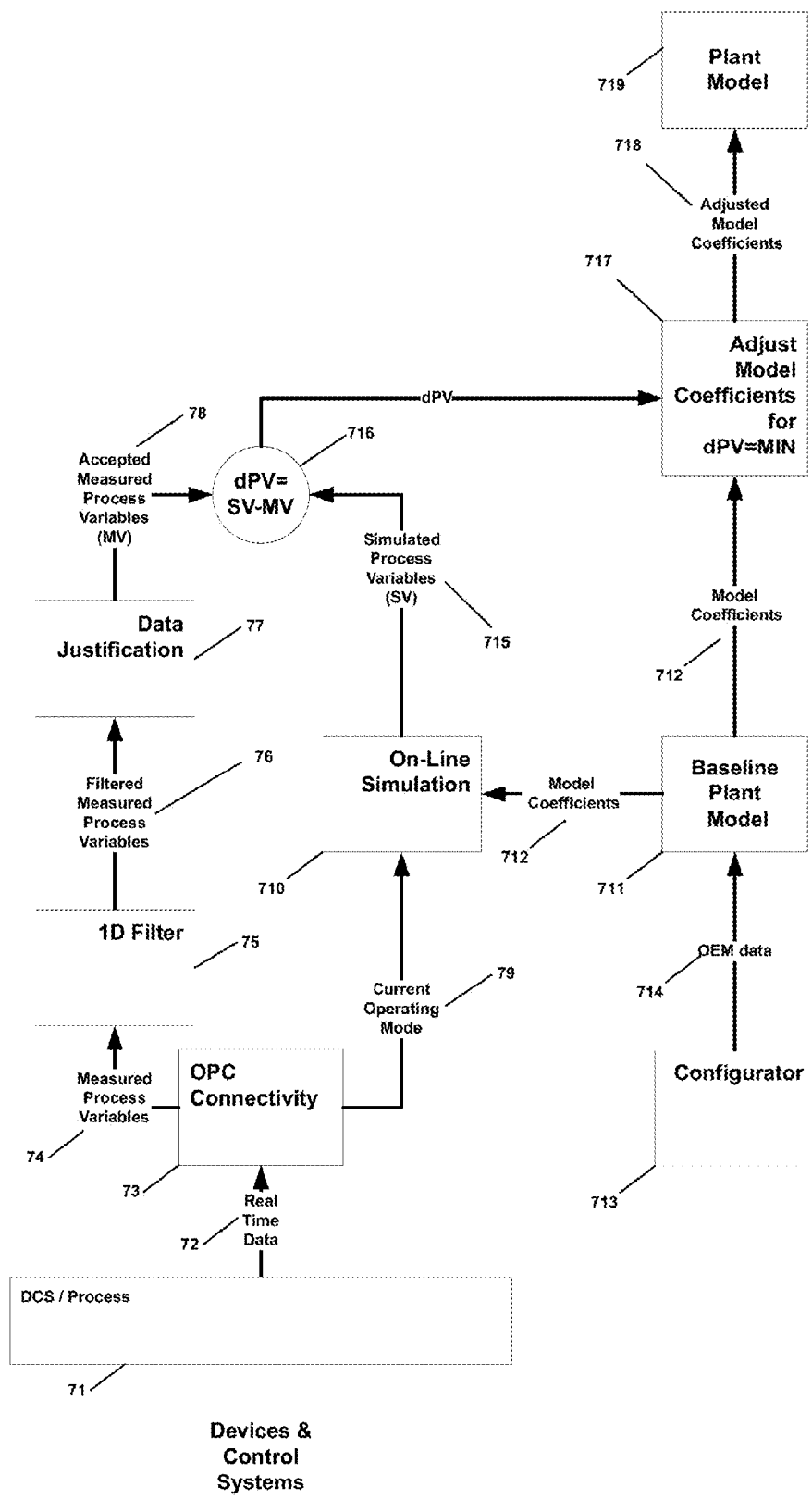
FIG. 7 shows the algorithm of the Coefficient Adjustment Module.

Referring now to FIG. 7, the model Coefficient Adjustment module is implemented with the following algorithm. Each real time input signal 72 provided by the DCS/Process 71 via OPC Connectivity 73 is regarded as a measurable variable 74. Each measurable variable 74 is filtered by a one-dimensional filter 75, using any one of the standard signal processing techniques including Kalman filters, exponential smoothing, and auto-regressive models among others.

The smoothed measured process variables 76 are fed into the Data Justification Module 77. The module rejects data points (outliers) whenever they fall beyond a specified distance from expected model values or whenever user-defined criteria is exceeded. The output of the Data Justification Module 77 is the set of all accepted measured process variables values (MV) 78.

Process simulation occurs concurrently with the live process. Information about current operating mode 79 is fed into Online Simulation Module 710 which also receives Baseline Plant Model's 711 current coefficients 712. Of note, the Baseline Plant Model 711 coefficients 712 are created by the Configurator/Operator 713 supplied Manufacturer data 714. Online Simulation Module 710 provides simulated process variables (SV) 715 for every time scan corresponding to measured variable values 78.

The ultimate goal of the algorithm is to automatically adjust process model coefficients to reflect current operating mode and ensure model accuracy at any given time. The algorithm uses particle filtering methods that are based on dynamic state space models described by the following set of equations:

$$\begin{cases} x_t = f(x_{t-1}) \\ y_t = g(x_t) \end{cases}$$

where f and g are estimated using polynomial regression, $x_t$ is a vector of state parameters at time t and $y_t$ are observed (measured) variables. Then $x_t$ is estimated using sequential importance sampling or sequential Monte Carlo sampling (from a simulated distribution), with general concepts of such simulation described well in A. Doucet et al, "Sequential Monte—Carlo Methods in Practice", Springer—Verlag, 2000.

Referring back to FIG. 7, the difference between the smoothed measured variable value and its corresponding simulated variable value dP 716 is minimized using the OLS method of fitting above mentioned function g. Effectively, the algorithm iteratively changes the sample weights such that the following occurs:

$$dP = \sum_{t=1}^{N} (y_t - g(x_t))^2 \to \min$$

The coefficients of function are thus adjusted by the module 717 to reflect the most accurate relationship between the simulated variable values and the measured variable values. The adjusted coefficients 718 are provided to the Plant Model 719 and overall algorithm repeats whenever process changes occur.

What is claimed is:

1. An advanced process control system for controlling a continuous processes comprising:
   a. a continuous real time dynamic process simulator running in parallel to a real continuous process;
   b. a Coefficient Adjustment Module that performs automatic coefficient adjustment of dynamic and static process models based on changes in the real process using a sequential Monte Carlo particle filter method;
   c. a multivariable predictive controller operating on a computing system;
   d. a real-time optimization module for receiving input from the multivariable predictive controller and real time data from a distributed control system; and
   e. a scheduling module on the computing system to create a schedule based upon the inputs and outputs of elements a.-e.

2. An advanced process control system of claim 1, wherein the process is a multi-unit plant operation in large scale processing and power generation industries, wherein a process is considered a large scale when it has thousands of control variable and control actions with tens of thousands of independent variables.

3. An advanced process control system of claim 1, wherein the continuous real time dynamic process simulator uses dynamic process models consisting of a set of differential equations.

4. An advanced process control system of claim 1, wherein the Coefficient Adjustment Module automatically adjusts both static and dynamic process models.

5. An advanced process control system of claim 1, wherein the Coefficient Adjustment Module uses ordinary least squares, partial least squares, decision trees, and artificial neural networks to build process models.

6. An advanced process control system of claim 1, wherein the Coefficient Adjustment Module automatically adjusts coefficients of both static and dynamic process models based on process changes using particle filters, also known as Sequential Monte Carlo (SMC) methods.

7. An advanced process control system of claim 6, wherein the process changes are detected by a time series and six sigma based shift detection algorithm.

8. An advanced process control system of claim 1, wherein the multivariable predictive controller provides real time content to the Operator via an integrated Visualization Module, which includes state-of-the-art data visualization components; this provides visual representation of static and dynamic models and visual representation of optimal operating point relative to modeled operating envelope.

9. An advanced process control system of claim 1, wherein the multivariable predictive controller predicts future changes in controlled variables and determines past changes in manipulated variables and disturbance variables.

10. An advanced process control system of claim 1, wherein the multivariable predictive controller calculates new changes in manipulated variables in order to ensure that control variable set points are reached and account for Operator chosen optimization criteria.

11. An advanced process control system of claim 1, wherein the real-time optimization module automatically constructs transfer functions through simulation.

12. An advanced process control system of claim 11, wherein the transfer functions are generated by simulated open-loop step performed on the current dynamic process model.

13. An advanced process control system of claim 11, wherein the process simulation is analytically achieved using a set of differential equations that comprise the dynamic process model.

14. An advanced process control system of claim 1, wherein the real-time optimization module simulates a disturbance variable and manipulated variable step change test such that disturbance variables and manipulated variables are changed separately to observe the controlled variable (CV) response.

15. An advanced process control system of claim 1, wherein the real-time optimization module performs several open-loop step change tests for each variable to obtain the transfer function within acceptable accuracy thresholds that are set by process operators or the system.

16. An advanced process control system of claim 11, wherein transfer functions can be generated for parallel, in-series, combination, and ambient disturbance variable input/output process architectures, in a setting of a large scale multi-unit process.

17. An advanced process control system of claim 11, wherein transfer functions are described by the first order plus time delay form, in a setting of a large scale multi-unit process.

18. An advanced process control system of claim 1, wherein the real-time optimization module automatically determines optimal operating mode specific to current conditions.

19. An advanced process control system of claim 1, wherein the real-time optimization module utilizes a variety of optimization techniques including integer programming, linear programming, mixed integer programming, mixed integer non-linear programming, quasi-Newton method, Nelder-Mead Simplex Method, and Lagrange multipliers.

20. An advanced process control system of claim 1, wherein the real-time optimization module automatically provides additional optimal operating scenarios through a variety of unit combinations.

21. An advanced process control system of claim 20, wherein the available optimal scenarios (based on a range of expected future conditions) are relayed to the Operator along with economic assessments through the Visualization Module, which includes state-of-the-art data visualization components.

22. An advanced process control system of claim 1, wherein the scheduling module calculates operational forecasts in accordance with planned production.

23. An advanced process control system of claim 22, wherein the planned production is provided by the Operator and can be set for any time period.

24. An advanced process control system of claim 1, wherein the scheduling module employs genetic algorithms to find optimal solutions to efficient operating mode problems, in particular, for finding an optimal combination of unit shut-downs and start-ups in a large scale process.

25. An advanced process control system of claim 1, wherein the scheduling module employs genetic algorithms to find optimal solutions to forecast parameter search problems.

26. An advanced process control system for controlling continuous processes comprising:
   a. a Coefficient Adjustment Module that performs a continuous real time dynamic process simulator running in parallel to a real process;
   b. a module performing an automatic coefficient adjustment of dynamic and static process models;
   c. a multivariable predictive controller operating on a computing system;
   d. a real-time optimization module for receiving input from the multivariable predictive controller and real time data from a distributed control system;
   e. a scheduling module on the computing system to create a schedule based upon the inputs and outputs of elements a.-e;
   f. wherein the Coefficient Adjustment Module automatically adjusts coefficients of both static and dynamic process models based on process changes using particle filters, also known as Sequential Monte Carlo (SMC) methods; and
   g. wherein the process changes are detected by a time series and six sigma based shift detection algorithm.

27. An advanced process control system for controlling continuous processes comprising:
   a. a continuous real time dynamic process simulator running in parallel to a real process;
   b. a module performing an automatic coefficient adjustment of dynamic and static process models;
   c. a multivariable predictive controller operating on a computing system;
   d. a real-time optimization module for receiving input from the multivariable predictive controller and real time data from a distributed control system;
   e. a scheduling module on the computing system to create a schedule based upon the inputs and outputs of elements a.-e; and
   f. wherein the real-time optimization module performs several open-loop step change tests for each variable to obtain the most accurate transfer function.

* * * * *